(12) United States Patent
Yanagawa et al.

(10) Patent No.: US 9,221,425 B2
(45) Date of Patent: Dec. 29, 2015

(54) WEBBING RETRACTOR

(75) Inventors: Wataru Yanagawa, Aichi-ken (JP);
Masaru Ukita, Aichi-ken (JP); Yoshiaki Maekubo, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 761 days.

(21) Appl. No.: 13/152,635

(22) Filed: Jun. 3, 2011

(65) Prior Publication Data
US 2011/0309178 A1 Dec. 22, 2011

(30) Foreign Application Priority Data

Jun. 18, 2010 (JP) .................... 2010-139013

(51) Int. Cl.
*B60R 22/36* (2006.01)
*B60R 22/34* (2006.01)
*B60R 22/28* (2006.01)

(52) U.S. Cl.
CPC ............. *B60R 22/36* (2013.01); *B60R 22/3413* (2013.01); *B60R 2022/287* (2013.01)

(58) Field of Classification Search
USPC ............................ 242/374, 379.1, 383, 384; 280/805–807; 297/470–472, 476–478
See application file for complete search history.

(56) References Cited

U.S. PATENT DOCUMENTS

| 4,445,604 | A | * | 5/1984 | Rogers, Jr. | ...................... 192/71 |
| 5,522,564 | A | * | 6/1996 | Schmidt et al. | ............... 242/374 |
| 2001/0038054 | A1 | * | 11/2001 | Mori et al. | .................. 242/382.2 |
| 2006/0055226 | A1 | * | 3/2006 | Ver Hoven et al. | ........ 297/463.2 |
| 2008/0067275 | A1 | * | 3/2008 | Sumiyashiki | ............... 242/379.1 |
| 2008/0203210 | A1 | * | 8/2008 | Nagata et al. | ............... 242/396.1 |
| 2011/0049284 | A1 | * | 3/2011 | Kaneko et al. | ................ 242/374 |

FOREIGN PATENT DOCUMENTS

JP 2007-84042 4/2007

* cited by examiner

*Primary Examiner* — Emmanuel M Marcelo
*Assistant Examiner* — Justin Stefanon
(74) *Attorney, Agent, or Firm* — Roberts Mlotkowski Safran & Cole P.C.

(57) ABSTRACT

A webbing retractor has a clutch mechanism including a lock member; a clutch cover, and a clutch guide that is positioned between the clutch cover and a spool. The clutch guide is capable of relatively rotating between an unactuated position and an actuated position with respect to the clutch cover, the clutch guide being engaged with a trigger member positioned on a side of the spool and being normally held in the unactuated position. A spring is provided in a compressed state between the clutch cover and the clutch guide, and a pawl is positioned between the clutch cover and the clutch guide, and engages with the ring unit when the trigger member disengages from the clutch guide. An axial-direction separation restricting mechanism restricts axial-direction separation between the clutch cover and the clutch guide while allowing the relative rotation between the clutch cover and the clutch guide.

10 Claims, 14 Drawing Sheets

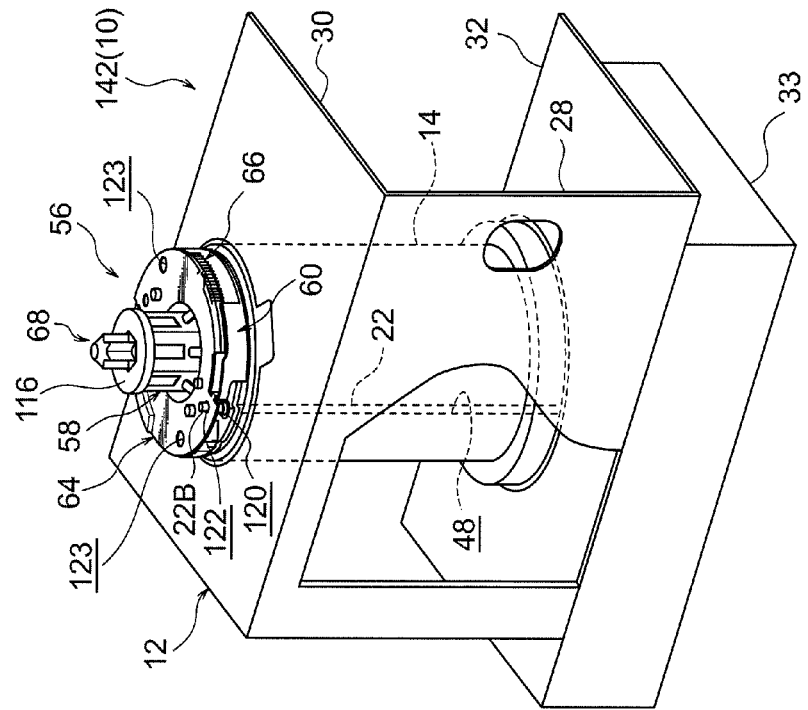
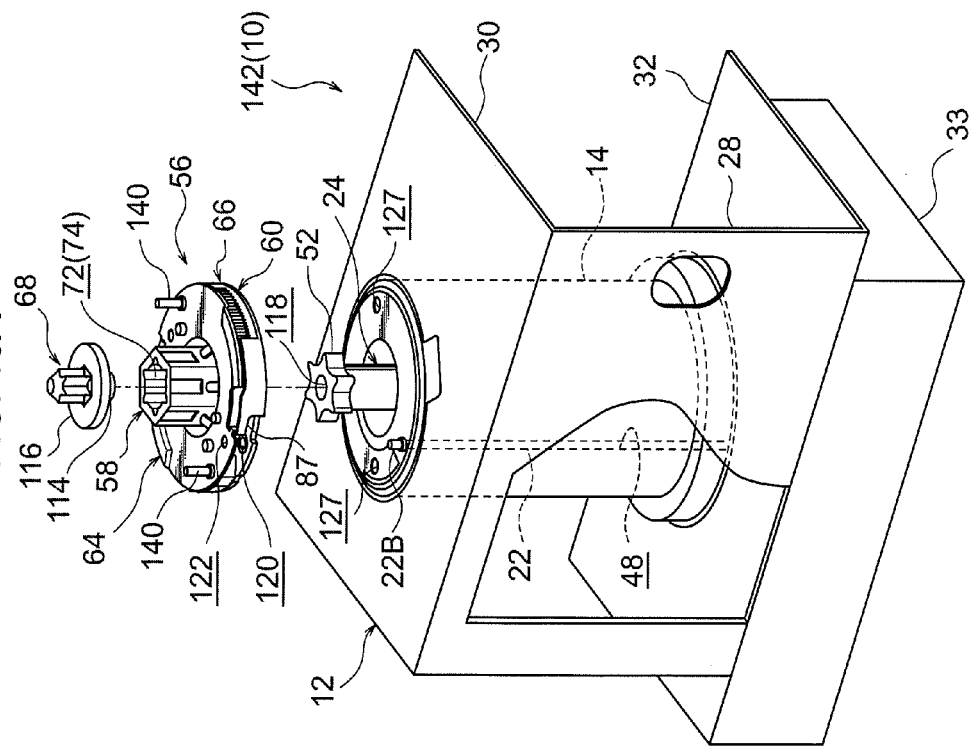

WEBBING RETRACTOR

CROSS-REFERENCE TO RELATED APPLICATIONS

This application is based on and claims priority under 35 USC 119 from Japanese Patent Application No. 2010-139013 filed on Jun. 18, 2010, the disclosure of which is incorporated by reference herein.

BACKGROUND OF THE INVENTION

1. Technical Field

The invention relates to a webbing retractor.

2. Related Art

Conventionally, there has been a known webbing retractor including a clutch mechanism that is attached to a torsion shaft rotating integrally with a spool and is capable of connecting the torsion shaft and a lock ring provided on a side of the frame, as disclosed in Japanese Patent Application Laid-Open (JP-A) No. 2007-84042.

The clutch mechanism disclosed in the above document includes: a second lock base that is positioned on one side in an axial direction of the spool, and is connected integrally to the torsion shaft; a rotating disk that is positioned on the opposite side of the second lock base from the spool, and is supported in a relatively rotatable manner with respect to the torsion shaft; and a second lock pawl that is rotatably placed between the second lock base and the rotating disk.

The rotating disk is engaged with a wire protruding from a side of the spool, so that relative rotation of the rotating disk with respect to the second lock base is restricted. The rotating disk is urged in one of the directions of rotation about the axis by the pushing force of a rotating-disk pushing spring placed between the rotating disk and the second lock base. When the above described wire retracts toward the spool, the rotating disk is rotated relatively with respect to the second lock base by the pushing force of the rotating-disk pushing spring, and the second lock pawl is guided by the rotating disk and protrudes outward in the radial direction of the second lock base. With this arrangement, the distal end of the second lock pawl is engaged with the inner circumferential portion of the lock ring, and the torsion shaft and the lock ring are connected via the clutch mechanism.

SUMMARY

When the above described webbing retractor is manufactured, it is necessary to assemble components of the clutch mechanism, such as the second lock base, the rotating disk, the second lock pawl, and the rotating-disk pushing spring by stacking one by one to the torsion shaft attached to a side of the spool. As a result, the installation of the clutch mechanism becomes inefficient.

The invention provides a webbing retractor in which assembling of the clutch mechanism can be efficiently performed.

To address the above subject, a webbing retractor according to a first aspect of the invention includes: a clutch mechanism that is attached to a rotatable member rotating integrally with a spool that is rotatably supported by a frame, the clutch mechanism being capable of connecting the rotatable member and a ring unit positioned at a side of the frame. The clutch mechanism includes: a lock member fixed to the rotatable member; a clutch cover that rotates integrally with the lock member; a clutch guide; a spring that is positioned between the clutch cover and the clutch guide, and is held in a compressed state; a pawl; and an axial-direction separation restricting mechanism.

The clutch guide is positioned between the clutch cover and the spool, and thus is restrained from moving in the axial direction. The clutch guide is supported in a relatively rotatable manner with respect to the lock member, and is capable of relatively rotating between an unactuated position and an actuated position with respect to the clutch cover. The clutch guide is further engaged with a trigger member positioned at a side of the spool, and therefore, is held in the unactuated position.

The spring urges the clutch guide held in the unactuated position toward the actuated position.

The pawl is positioned between the clutch cover and the clutch guide. In the event that the trigger member is disengaged from the clutch guide, the clutch guide is rotated from the unactuated position to the actuated position by the urging force of the spring. As a result, the pawl is moved toward the ring unit and is engaged with the ring unit.

The axial-direction separation restricting mechanism includes a hooked portion that is formed at one of the clutch cover or the clutch guide and extends in a circumferential direction of the clutch guide, and a hook that is formed at the other one of the clutch cover or the clutch guide and hooks the hooked portion. The axial-direction separation restricting mechanism restricts axial-direction separation between the clutch cover and the clutch guide, while allowing the relative rotation of the clutch cover and the clutch guide with respect to each other.

In the webbing retractor according to the first aspect, the lock member configuring the clutch mechanism is fixed to the rotatable member, and the clutch guide is positioned between the spool and the clutch cover rotating integrally with the lock member, so that movement of the clutch guide in the axial direction is restricted. The clutch guide is supported in a relatively rotatable manner with respect to the lock member, and can be relatively rotated with respect to the clutch cover between the unactuated position and the actuated position. However, the clutch guide is engaged with the trigger member provided on a side of the spool, so that the clutch guide is held in the unactuated position. When the trigger member is disengaged from the clutch guide, the clutch guide is rotated from the unactuated position to the actuated position by virtue of the urging force of the spring interposed between the clutch guide and the clutch cover. Accordingly, the pawl placed between the clutch guide and the clutch cover is moved toward the ring unit provided on a side of the frame, and is engaged with the ring unit. In this manner, the rotatable member and the ring unit are connected via the clutch mechanism.

This webbing retractor includes the axial-direction separation restricting mechanism that includes the hooked portion that is formed at one of the clutch cover or the clutch guide, and that extends in the circumferential direction of the clutch guide; and the hook that is formed at the other one of the clutch cover or the clutch guide, and hooks the hooked portion. This axial-direction separation restricting mechanism restricts axial-direction separation between the clutch cover and the clutch guide, while allowing the relative rotation of the clutch cover and the clutch guide with respect to each other. Therefore, when the webbing retractor is being assembled, axial-direction separation between the clutch cover and the clutch guide can be prevented, even if the lock member is yet to be fixed to the rotatable member (or if the clutch mechanism is yet to be attached to the rotatable member). That is, in the above described clutch mechanism, axial-direction movement of the clutch guide is not restricted by the spool, before the lock member is fixed to the rotatable member. Therefore, the clutch guide is likely to move away from the clutch cover due to the pushing force of the compressed spring located between the clutch guide and the clutch cover. However, the separation can be restricted according to this aspect. Accordingly, the clutch mechanism can be subassembled, and the installation of the clutch mechanism can be made more efficient.

A webbing retractor according to a second aspect of the invention includes: a clutch mechanism that is attached to a rotatable member rotating integrally with a spool that is rotatably supported by a frame, the clutch mechanism being capable of connecting the rotatable member and a ring unit positioned at a side of the frame. The clutch mechanism includes: a lock member fixed to the rotatable member; a clutch cover that rotates integrally with the lock member; a clutch guide; a spring; a pawl; a first preset hole formed in the clutch cover; and a second preset hole that is formed in the clutch guide, and faces the first preset hole when the clutch guide is positioned in an unactuated position.

The clutch guide is positioned between the clutch cover and the spool, and thus is restrained from moving in the axial direction. The clutch guide is also supported in a relatively rotatable manner with respect to the lock member, and is capable of relatively rotating between the unactuated position and an actuated position with respect to the clutch cover. The clutch guide is further engaged with a trigger member positioned at a side of the spool, and therefore, is held in the unactuated position.

The spring is interposed between the clutch cover and the clutch guide, and is held in a compressed state. The spring urges the clutch guide held in the unactuated position toward the actuated position.

The pawl is positioned between the clutch cover and the clutch guide. When the trigger member is disengaged from the clutch guide, the clutch guide is rotated from the unactuated position to the actuated position by the urging force of the spring. As a result, the pawl is moved toward the ring unit and is engaged with the ring unit.

In the webbing retractor according to the second aspect, the lock member forming the clutch mechanism is fixed to the rotatable member, and the clutch guide is positioned between the spool and the clutch cover rotating integrally with the lock member, so that movement of the clutch guide in the axial direction is restricted. The clutch guide is supported in a relatively rotatable manner with respect to the lock member, and can be relatively rotated with respect to the clutch cover between the unactuated position and the actuated position. However, the clutch guide is engaged with the trigger member provided at a side of the spool, so that the clutch guide is held in the unactuated position. When the trigger member is disengaged from the clutch guide, the clutch guide is rotated from the unactuated position to the actuated position by virtue of the urging force of the spring interposed between the clutch guide and the clutch cover. Accordingly, the pawl placed between the clutch guide and the clutch cover is moved toward the ring unit provided at a side of the frame, and is engaged with the ring unit. In this manner, the rotatable member and the ring unit are connected via the clutch mechanism.

This webbing retractor has the first preset hole formed in the clutch cover, and the second preset hole that is formed in the clutch guide and faces the first preset hole when the clutch guide is positioned in the unactuated position. With this structure, a pin is inserted into the first preset hole and the second preset hole, so that the clutch cover and the clutch guide can be connected via the pin. In this manner, the clutch guide can be held in the unactuated position, despite the urging force of the spring interposed between the clutch cover and the clutch guide. Accordingly, when the webbing retractor is being assembled, the clutch mechanism can be subassembled while the clutch guide is held in the unactuated position, even if the clutch guide is yet to be engaged with the trigger member, or the clutch mechanism is yet to be attached to the rotatable member. Thus, the installation of the clutch mechanism can be made more efficient. The above described pin can be pulled out of the first and second preset holes, after the clutch mechanism is attached to the rotatable member and the trigger member is engaged with the clutch guide.

A webbing retractor according to a third aspect of the invention includes: a clutch mechanism that is attached to a rotatable member rotating integrally with a spool that is rotatably supported by a frame, the clutch mechanism being capable of connecting the rotatable member and a ring unit positioned at a side of the frame. The clutch mechanism includes: a lock member fixed to the rotatable member; a clutch cover that rotates integrally with the lock member; a clutch guide; a spring; a pawl; an axial-direction separation restricting mechanism; a first preset hole formed in the clutch cover; and a second preset hole that is formed in the clutch guide, and faces the first preset hole when the clutch guide is positioned in an unactuated position.

The clutch guide is positioned between the clutch cover and the spool, and thus is restrained from moving in the axial direction. The clutch guide is also supported in a relatively rotatable manner with respect to the lock member, and is capable of relatively rotating between the unactuated position and an actuated position with respect to the clutch cover. The clutch guide is further engaged with a trigger member positioned at a side of the spool, and therefore, is held in the unactuated position.

The spring is in a compressed state, and is interposed between the clutch cover and the clutch guide. The spring urges the clutch guide held in the unactuated position toward the actuated position.

The pawl is positioned between the clutch cover and the clutch guide. When the trigger member is disengaged from the clutch guide, the clutch guide is rotated from the unactuated position to the actuated position by the pushing force of the spring. As a result, the pawl is moved toward the ring unit and is engaged with the ring unit.

The axial-direction separation restricting mechanism includes a hooked portion that is formed at one of the clutch cover or the clutch guide and extends in a circumferential direction of the clutch guide, and a hook that is formed at the other one of the clutch cover or the clutch guide and hooks the hooked portion. The axial-direction separation restricting mechanism restricts axial-direction separation between the clutch cover and the clutch guide, while allowing the relative rotation of the clutch cover and the clutch guide with respect to each other.

In the webbing retractor according to the third aspect, the lock member forming the clutch mechanism is fixed to the rotatable member, and the clutch guide is positioned between the spool and the clutch cover rotating integrally with the lock member, so that movement of the clutch guide in the axial direction is restricted. The clutch guide is supported in a relatively rotatable manner with respect to the lock member, and can be relatively rotated with respect to the clutch cover between the unactuated position and the actuated position. However, the clutch guide is engaged with the trigger member provided at a side of the spool, so that the clutch guide is held in the unactuated position. When the trigger member is disengaged from the clutch guide, the clutch guide is rotated from the unactuated position to the actuated position by virtue of the urging force of the spring interposed between the clutch guide and the clutch cover. Accordingly, the pawl placed between the clutch guide and the clutch cover is moved toward the ring unit provided at a side of the frame, and is engaged with the ring unit. In this manner, the rotatable member and the ring unit are connected via the clutch mechanism.

This webbing retractor includes the axial-direction separation restricting mechanism that includes the hooked portion that is formed at one of the clutch cover or the clutch guide and that extends in the circumferential direction of the clutch guide, and the hook that is formed at the other one of the clutch cover or the clutch guide and hooks the hooked portion in the axial direction of the clutch guide. This axial-direction separation restricting mechanism restricts axial-direction separation between the clutch cover and the clutch guide, while allowing the relative rotation of the clutch cover and the clutch guide with respect to each other. Therefore, when the webbing retractor is being assembled, axial-direction separation between the clutch cover and the clutch guide can be prevented, even if the lock member is yet to be fixed to the rotatable member (or if the clutch mechanism is yet to be attached to the rotatable member). That is, in the above described clutch mechanism, axial-direction movement of the clutch guide is not restricted by the spool, before the lock member is fixed to the rotatable member. Therefore, the clutch guide is likely to move away from the clutch cover due to the urging force of the compressed spring located between the clutch guide and the clutch cover. However, the separation can be restricted according to this aspect. Accordingly, the clutch mechanism can be subassembled.

This webbing retractor further has the first preset hole formed in the clutch cover, and the second preset hole that is formed in the clutch guide and faces the first preset hole when the clutch guide is positioned in the unactuated position. With this structure, a pin is inserted into the first preset hole and the second preset hole, so that the clutch cover and the clutch guide can be connected via the pin. In this manner, the clutch guide can be held in the unactuated position, despite the urging force of the spring interposed between the clutch cover and the clutch guide. Accordingly, when the webbing retractor is being assembled, the clutch mechanism can be subassembled while the clutch guide is held in the unactuated position, even if the clutch guide is yet to be engaged with the trigger member, or the clutch mechanism is yet to be attached to the rotatable member. The above described pin can be pulled out of the first and second preset holes, after the clutch mechanism is attached to the rotatable member and the trigger member is engaged with the clutch guide.

As described above, according to each of the above described aspects, the clutch mechanism can be subassembled, and accordingly, the installation of the clutch mechanism can be made more efficient.

According to a fourth aspect of the invention, in the webbing retractor according to the first or third aspect, the hook may be formed at the clutch cover, and the spring may be latched by the hook.

In the webbing retractor according to the fourth aspect, the spring is latched by the hook that is formed at the clutch cover and forms the axial-direction separation restricting mechanism. That is, the hook that functions as the latch for the spring also has the function to restrict separation between the clutch cover and the clutch guide. Accordingly, the axial-direction separation restricting mechanism can have a simple structure.

According to a fifth aspect of the invention, in the webbing retractor according to the first or third aspect, the hook may hook the hooked portion in the axial direction of the clutch guide.

In the webbing retractor according to the fifth aspect, the hook may hook the hooked portion in the axial direction of the clutch guide. Accordingly, separation of the clutch cover and the clutch guide in the axial direction thereof is preferably prevented.

According to a sixth aspect of the invention, in the webbing retractor according to the fourth aspect, the spring may be a coil spring, and the hook may include an inward protruding part that protrudes inward in a radial direction of the clutch cover and is in contact with an axial-direction end of the coil spring, an outward protruding part that protrudes outward in the radial direction of the clutch cover and is engaged with the hooked portion of the clutch guide, and a circumferentially protruding part that protrudes in a circumferential direction of the clutch cover and is inserted into the coil spring.

In the webbing retractor according to the sixth aspect, the circumferentially protruding part formed in the hook of the clutch cover is inserted into the coil spring, and the inward protruding part formed in the hook is in contact with the axial-direction end of the coil spring, so that the coil spring is latched by the hook. Also, the outward protruding part formed in the hook is engaged with the hooked portion of the clutch guide, so that axial-direction separation between the clutch cover and the clutch guide is restricted. With this arrangement, the hook that forms both the latch for the coil spring and the axial-direction separation restricting mechanism can have a simple structure.

According to a seventh aspect of the invention, in the webbing retractor according to the second or third aspect, the spool may have a third preset hole formed therein, and the third preset hole faces the first preset hole and the second preset hole when the clutch guide is positioned in the unactuated position.

In the webbing retractor according to the seventh aspect, the third preset hole formed in the spool faces the first preset hole of the clutch cover and the second preset hole of the clutch guide, with the clutch guide being positioned in the unactuated position. Therefore, a pin is inserted into the first preset hole and the second preset hole, to subassemble the clutch mechanism. When the clutch mechanism is attached to the rotatable member attached to a side of the spool, the trigger member attached to the spool is engaged with the clutch guide, and the pin is inserted into the third preset hole. In this manner, the clutch mechanism can be positioned with respect to the spool and the rotatable member, and the installation of the clutch mechanism can be even more efficient. The above described pin can be pulled out of the first through third preset holes, after the clutch mechanism is attached to the rotatable member.

As described above, the webbing retractor according to any of the aspects can be made smaller and lighter than conventional ones, and can ensure excellent connection strength between the pawl and the ring unit.

BRIEF DESCRIPTION OF THE DRAWINGS

FIG. 6A is a diagram showing a situation where the clutch guide is positioned in an actuated position with respect to the clutch cover; and FIG. 6B is a diagram showing a situation where the clutch guide is positioned in an unactuated position with respect to the clutch cover;

FIGS. 15A and 15B are perspective views for explaining a situation where the clutch mechanism is mounted on a semi-finished product of the webbing retractor: FIG. 15A shows a situation prior to the installation; and FIG. 15B shows a situation after the installation.

DESCRIPTION

Herebelow, an example of an exemplary embodiment of the present invention will be described in detail with reference to the drawings.

Figure 1:
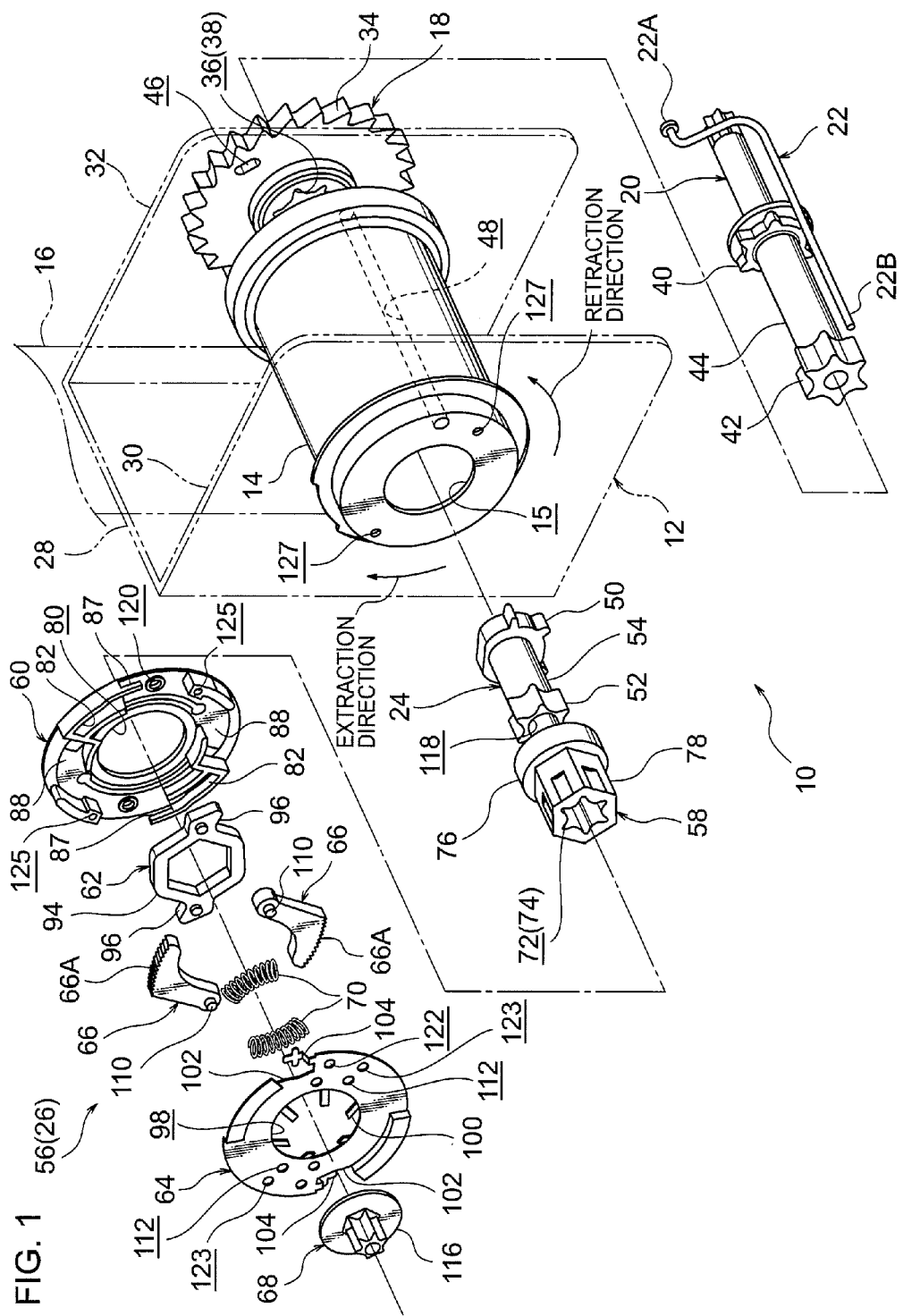
FIG. 1 is an exploded perspective view showing relevant parts of a webbing retractor according to an exemplary embodiment of the invention.
Figure 2:
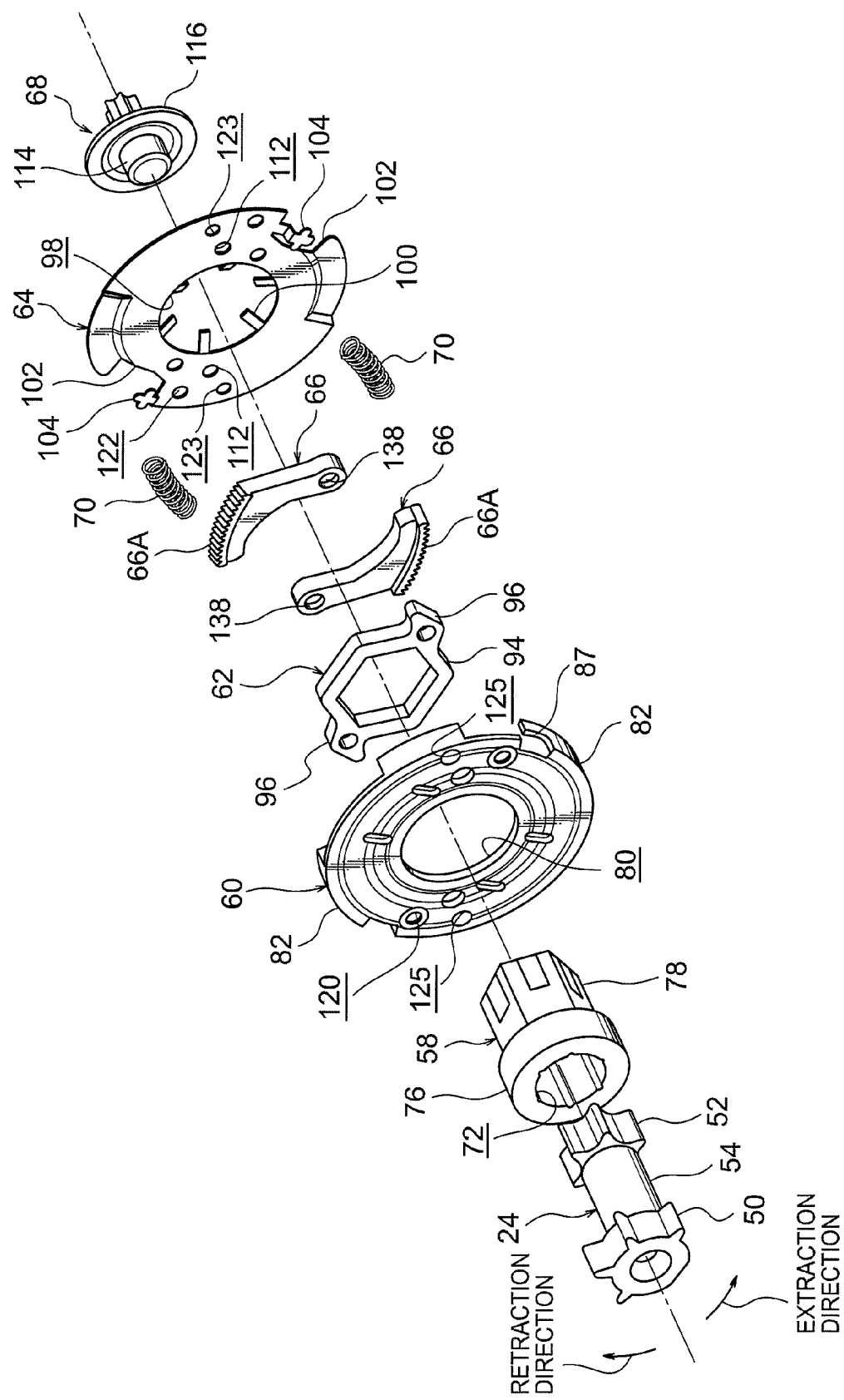
FIG. 2 is an exploded perspective view showing the structure of a clutch mechanism that is a component of the webbing retractor shown in FIG. 1.

As shown in FIGS. 1 and 2, a webbing retractor 10 according to an exemplary embodiment of the invention includes a frame 12, a spool 14, a webbing belt 16, a lock gear 18, a main torsion shaft 20, a trigger wire 22 as a trigger member, a sub torsion shaft 24 as a rotatable member, and a load transfer mechanism 26.

The frame 12 has a plate-like back board 28 fixed to a vehicle. Leg plates 30 and 32 extend perpendicularly from both ends of the back board 28, and the frame 12 has a cup-like shape, when seen in a plan view. A known lock mechanism 33 (see FIG. 15, not shown in FIG. 1) is the outer side of the leg plate 32.

The spool 14 is formed in a cylindrical shape having a through hole 15 that penetrates through the spool 14 in the axial direction, and the spool 14 is positioned between the leg plate 30 and the leg plate 32 of the frame 12. The spool 14 is positioned so that the direction of axis is parallel to the facing direction of the leg plate 30 and the leg plate 32, and is rotatably supported by the frame 12 via the main torsion shaft 20 and the sub torsion shaft 24 described below.

The webbing belt 16 is to be attached to a passenger's body, and its proximal end that is one of the end portions in the longitudinal direction is caught by the spool 14. The spool 14 rotates in the direction of retraction, which is one of directions of rotation of the spool 14, so as to wind up and hold the webbing belt 16 from the proximal end.

The lock gear 18 is positioned coaxially with the spool 14 and is located at one side of the spool 14 in the axial direction. A gear portion 34 is formed along the outer circumference of the lock gear 18. A through hole 36 that penetrates through the lock gear 18 in an axial direction is formed in the shaft center part of the lock gear 18, and an engaged unit 38 of a spline type is formed along the inner circumference of the through hole.

The main torsion shaft 20 is positioned coaxially with the spool 14 and the lock gear 18, and is inserted into the through hole 15 of the spool 14 and the through hole 36 of the lock gear 18. A first engaging unit 40 of a spline type is formed at the center part in the longitudinal direction of the main torsion shaft 20, and a second engaging unit 42 of a spline type is also formed at the distal end of the main torsion shaft 20.

The first engaging unit 40 is engaged with the engaged unit 38 of the lock gear 18, so that the main torsion shaft 20 is secured to the lock gear 18 in an integrally rotatable manner. The second engaging unit 42 is engaged with an engaged unit (not shown) formed in the intermediate part in the axial direction of the inner circumference of the spool 14, so that the main torsion shaft 20 is secured to the spool 14 in an integrally rotatable manner.

The portion between the first engaging unit 40 and the second engaging unit 42 in the main torsion shaft 20 serves as a first energy absorbing unit 44 that absorbs the energy that is generated by pulling-out of the webbing belt 16 as described below.

The trigger wire 22 extends along the main torsion shaft 20. The end 22A of the trigger wire 22 is inserted to a hole 46 formed in the lock gear 18 at a location on a radially outer side of the through hole 36, and is thus locked by the lock gear 18. On the other hand, the distal end side extending from the end 22A of the trigger wire 22 is inserted into a hole 48 that is formed in the spool 14 and extends parallel to the through hole 15. The distal end 22B of the trigger wire 22 protrudes from the spool 14 to the other side in the axial direction of the spool 14.

The sub torsion shaft 24 is positioned coaxially with the main torsion shaft 20, and the proximal end side extending from the center part in the longitudinal direction of the sub torsion shaft 24 is inserted into the through hole 15 of the spool 14. On the other hand, the distal end side extending from the center part in the longitudinal direction of the sub torsion shaft 24 is protruded from the spool 14 toward the other side in the axial direction of the spool 14.

A first engaging unit 50 of a spline type is formed at the proximal end of the sub torsion shaft 24, and a second engaging unit 52 of a spline type is also formed at the distal end of the sub torsion shaft 24. The first engaging unit 50 is engaged with the engaged unit (not shown) formed in the intermediate part in the axial direction of the inner circumference of the spool 14, so that the sub torsion shaft 24 is secured to the spool 14 in an integrally rotatable manner.

The portion between the first engaging unit 50 and the second engaging unit 52 in the sub torsion shaft 24 serves as a second energy absorbing unit 54 that absorbs the energy generated by pulling out of the webbing belt 16 as described below.

Figure 3:
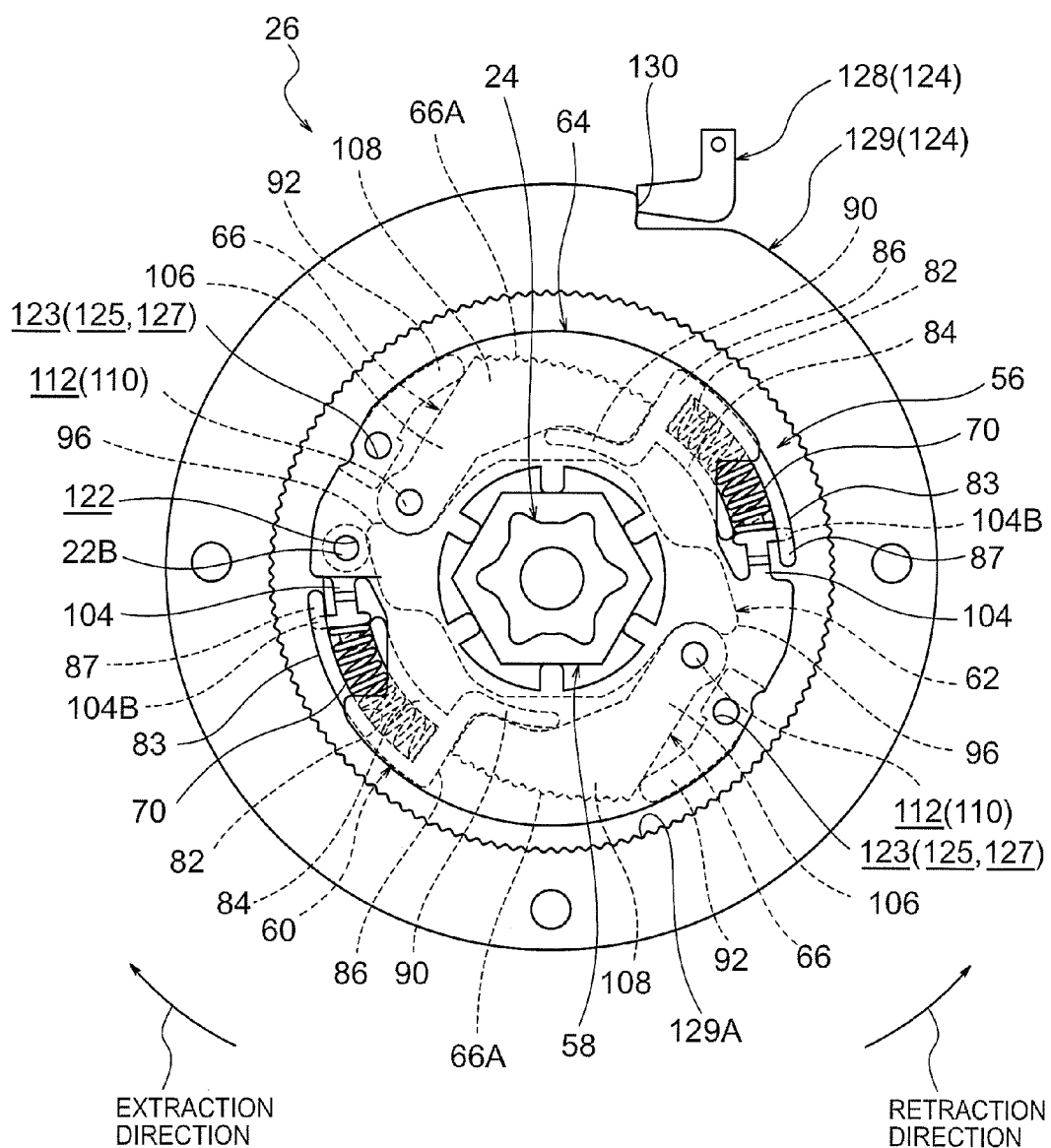
FIG. 3 is a diagram showing a load transfer mechanism that is a component of the webbing retractor shown in FIG. 1, the load transfer mechanism being viewed from the opposite side from the spool.
Figure 4:
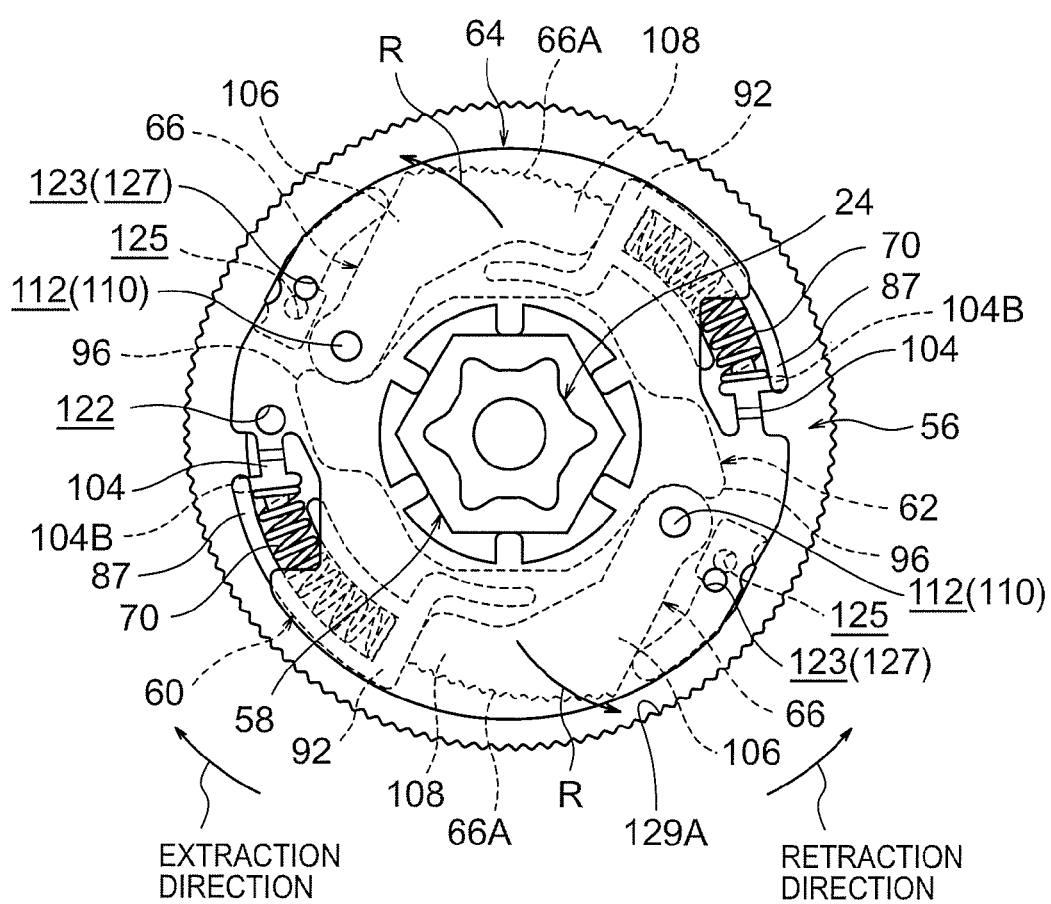
FIG. 4 is a diagram showing a situation where the clutch plates of the load transfer mechanism shown in FIG. 3 start rotating toward the lock ring.
Figure 5:
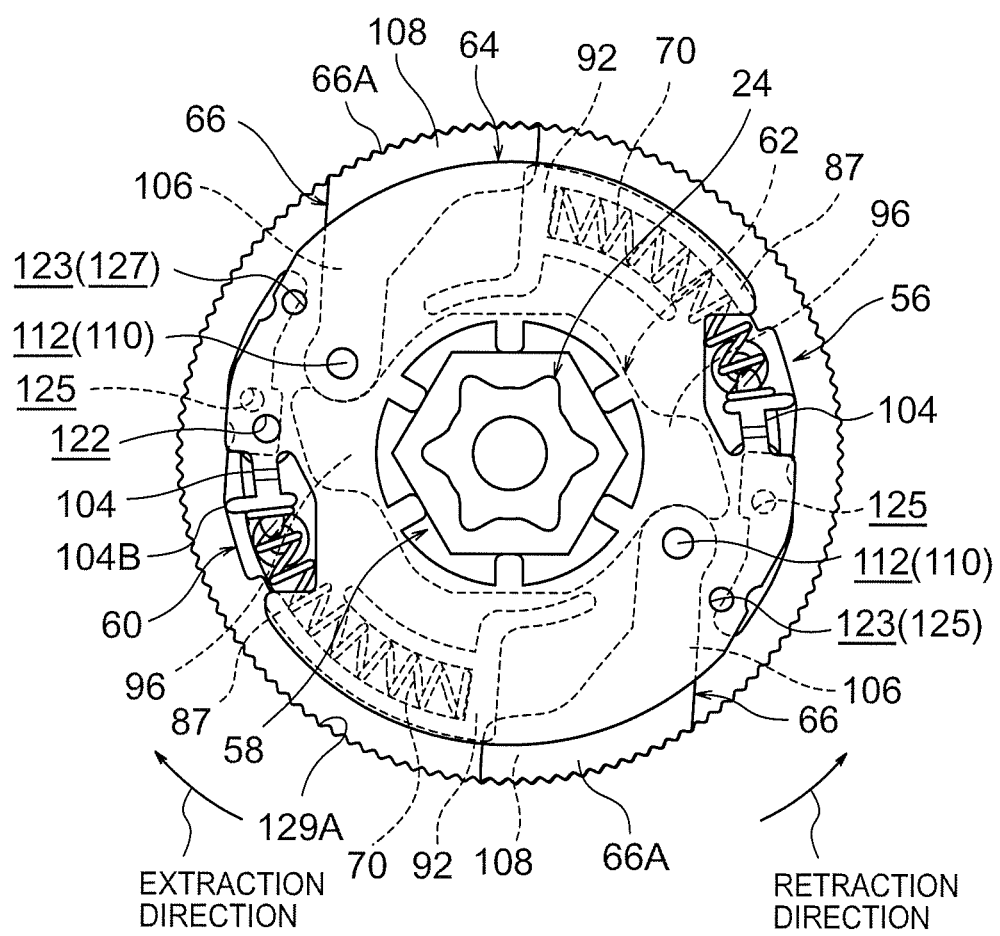
FIG. 5 is a diagram showing a situation where the clutch plates of the load transfer mechanism shown in FIG. 3 mesh with the lock ring.

As shown in FIG. 3, the load transfer mechanism 26 includes a clutch mechanism 56 and a switch mechanism 124. The clutch mechanism 56 includes a sleeve 58 serving as a lock member, a clutch guide 60, a clutch base 62, a clutch cover 64, a pair of clutch plates 66 serving as a pawl, a screw 68, and a pair of coil springs 70. FIG. 4 shows a situation where the clutch mechanism 56 is in operation, and FIG. 5 shows a situation where the clutch mechanism 56 has finished an operation.

The sleeve 58 is positioned coaxially with the sub torsion shaft 24. A through hole 72 that penetrates through the sleeve 58 in the axial direction is formed in the shaft center part of the sleeve 58, and the above described sub torsion shaft 24 is loosely inserted into the through hole 72. An engaged unit 74 of a spline type is formed on the distal end side of the inner circumference of the sleeve 58. The second engaging unit 52 is engaged with the engaged unit 74, so that the sleeve 58 is secured to the sub torsion shaft 24 in an integrally rotatable manner.

The proximal end side of the sleeve 58 serves as a supporting unit 76 having a circular external shape, and the distal end side extending from the supporting unit 76 in the sleeve 58 serves as an engaging unit 78 having a hexagonal external shape.

The clutch guide 60 is a molded resin part, and is formed in a ring-like shape having a through hole 80 that penetrates through the clutch guide 60 in the axial direction. The above described supporting unit 76 is inserted into the through hole 80, so that the clutch guide 60 is supported by the sleeve 58 in a relatively rotatable manner.

As shown in FIG. 3, a pair of coil spring housings 82 that house the coil springs 70 are formed at two locations in a circumferential direction in the clutch guide 60. Those coil spring housing 82 are positioned symmetrically with respect to the center point of the clutch guide 60. Each of the coil spring housings 82 is formed in a cup-like shape that has an outer wall 83 and an inner wall 84 extending in the circumferential direction of the clutch guide 60, and a connecting wall 86 that extends in a radial direction of the clutch guide 60 and connects the end portions of the outer wall 83 and the inner wall 84. A hooked portion 87 protrudes from the end portion on the opposite side of each connecting wall 86 from the outer wall 83. Those hooked portions 87 are formed along the circumference of the clutch guide 60, and correspond to cross claws 104 (hooking portions) of the clutch cover 64 described below.

A pair of clutch plate housings 88 that house the clutch plates 66 are also formed adjacent to the respective coil spring housings 82 in the clutch guide 60. Each of those clutch plate housings 88 includes a first supporting wall 90 that extends to the opposite side of the inner wall 84 from the connecting wall 86, and a second supporting wall 92 that is positioned on the opposite side of the outer wall 83 with respect to the connecting wall 86 with having a distance from the connecting wall 86.

The clutch base 62 is designed to have an engaged unit 94 having a hexagonally ring-like shape. The engaging unit 78 of the sleeve 58 is engaged with (pressed into) the engaged unit 94, so that the clutch base 62 is secured to the sleeve 58 in an integrally rotatable manner. It should be noted that, in other exemplary embodiments, the sleeve 58 may be formed integrally with the clutch base 62. The clutch base 62 also has a pair of latch parts 96 that protrude outward from the engaged unit 94. Those latch parts 96 are latched by the proximal ends of arms 106 formed in the clutch plates 66 described below.

The clutch cover 64 is positioned coaxially with the sleeve 58, and is located at the opposite side of the spool 14 with respect to the clutch guide 60, facing the clutch guide 60. The clutch cover 64 is formed in a ring-like shape having a through hole 98 that penetrates through the clutch cover 64 in the axial direction. Engaging claws 100 that protrude radially inward are formed on the inner circumference of the clutch cover 64. The above described engaging unit 78 is inserted into the through hole 98, and the engaging claws 100 are engaged with the engaging unit 78, so that the clutch cover 64 is secured to the sleeve 58 or the sub torsion shaft 24 in an integrally rotatable manner. The clutch cover 64 has cross claws 104 that are described later. The cross claws 104 are engaged with the clutch guide 60 in the circumferential direction thereof, so that the clutch guide 60 is relatively rotatable with respect to the clutch cover 64 between an actuated position shown in FIGS. 5 and 6A and an unactuated position shown in FIGS. 3 and 6B.

Notches 102 that open radially outward and each have a concave shape when viewed in the axial direction are formed at two locations in a circumferential direction of the clutch cover 64. A pair of cross claws 104 that are located inside the respective notches 102 are also formed in the clutch cover 64. The pair of cross claws 104 are formed symmetrically with respect to the center point of the clutch cover 64. Those cross claws 104 are bent in a crank fashion when viewed in the radial direction of the clutch cover 64, and the distal end sides of the cross claws 104 protrude toward the clutch guide 60, compared with the proximal end sides of the cross claws 104.

Figure 7:
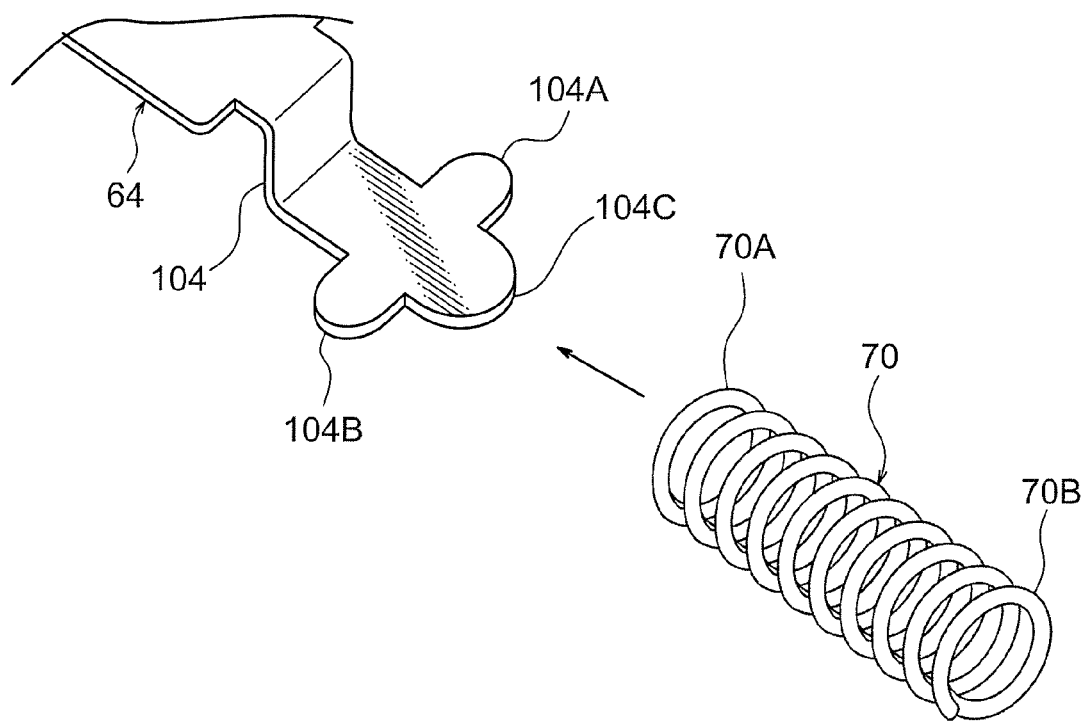
FIG. 7 is an exploded perspective view showing the structures of a cross claw formed in the clutch cover shown in FIGS. 1 through 6 and a coil spring.

As shown in FIG. 7, the distall end side of each of the cross claws 104 has an inward protruding part 104A that protrudes inward in the radial direction of the clutch guide 60, an outward protruding part 104B that protrudes outward in the radial direction of the clutch guide 60, and a circumferentially protruding part 104C that protrudes in one direction (the retraction direction) of the circumferential directions of the clutch guide 60. The distal end side of each of the cross claws 104 has a cross-like shape when viewed from the axial direction of the clutch guide 60.

Figure 6A:
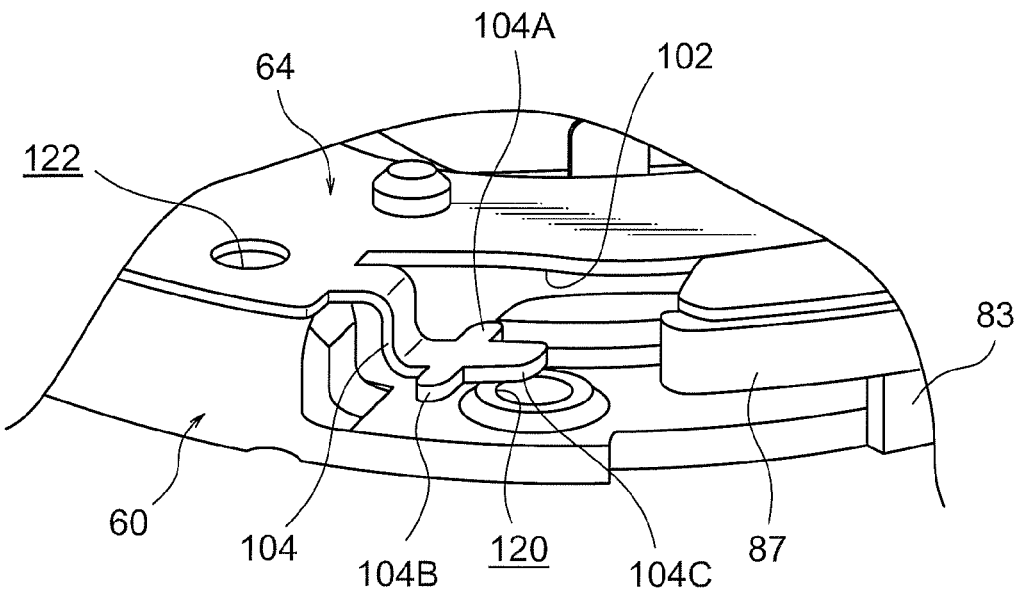
FIGS. 6A and 6B are enlarged perspective views showing part of the clutch mechanism shown in FIGS. 1 through 5.
Figure 6B:
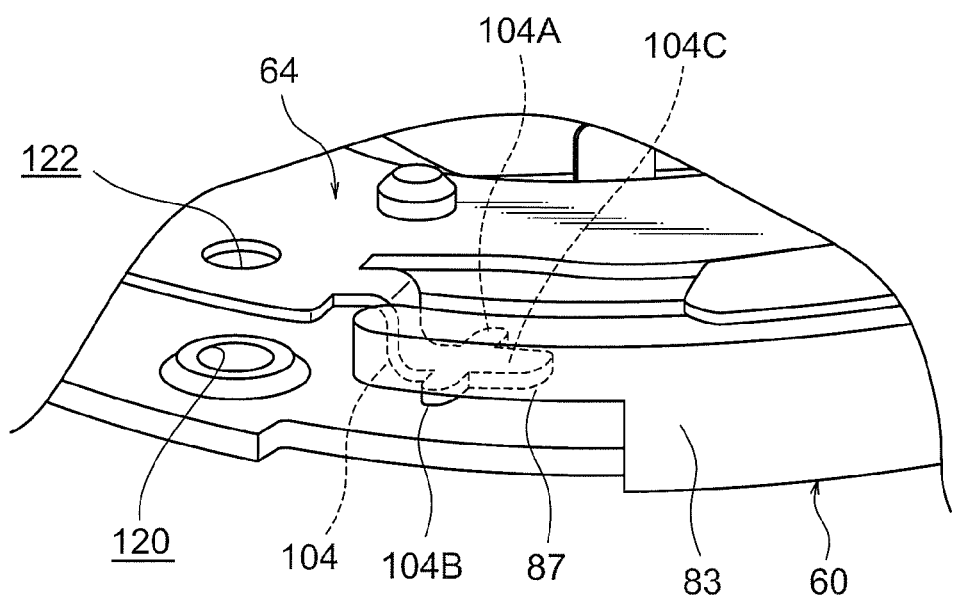

The outward protruding part 104B of each of the cross claws 104 is located at a distance from each corresponding hooked portion 87 of clutch guide 60 in a circumferential direction of the clutch guide 60, when the clutch guide 60 is positioned in the actuated position (the position shown in FIGS. 5 and 6A). The outward protruding part 104B of each of the cross claws 104 is positioned at a side of the spool 14 of each corresponding hooked portions 87 (on the lower side in FIGS. 6A and 6B), when the clutch guide 60 is positioned in the unactuated position (the position shown in FIGS. 3 and 6B). Therefore, when the clutch guide 60 is positioned in the unactuated position, the inward protruding parts 104B of the respective cross claws 104 hook the respective hooked portions 87 in the axial direction of the clutch guide 60, so that the clutch cover 64 and the clutch guide 60 are prevented from separating each other in the axial direction.

The clutch plates 66 are positioned between the clutch cover 64 and the clutch guide 60. Each clutch plate 66 includes an arm 106 and an arc part 108 formed at the distal end of the arm 106. A rotating shaft 110 that protrudes toward the clutch cover 64 and extends in the axial direction of the sub torsion shaft 24 is formed at the proximal end of each arm 106. The rotating shafts 110 are inserted into holes 112 formed in the clutch cover 64, so that the clutch plates 66 are rotatably supported by the clutch cover 66. Knurling 66A in the form of flat teeth is also formed on the outer circumference of each arc part 108 (the distal end of each clutch plate 66).

The screw 68 is designed to have a thread 114 and a holding part 116 that has a larger diameter than the thread 114. The thread 114 is screwed into a screw hole 118 formed in the distal end of the sub torsion shaft 24, so that the screw 68 is secured to the distal end of the sub torsion shaft 24. With the screw 68 being secured to the distal end of the sub torsion shaft 24, the holding part 116 is in contact with the distal end of the sleeve 58. Accordingly, the sleeve 58 is restrained from moving in the extraction direction with respect to the sub torsion shaft 24. In this situation, the clutch guide 60 is restrained by the clutch cover 64 and the spool 14 from moving in the axial direction.

Holes 120 and 122 are formed in the above described clutch guide 60 and the clutch cover 64, respectively. Those holes 120 and 122 are designed to face each other when the clutch guide 60 is positioned in the unactuated position with respect to the clutch cover 64, and the distal end 22B of the trigger wire 22 is inserted into each of the holes 120 and 122. With this arrangement, the clutch guide 60 is restrained from rotating relatively with respect to the spool 14 and the clutch cover 64 when positioned in the unactuated position (or the clutch guide 60 is held in the unactuated position).

In this exemplary embodiment, a pair of first preset holes 123 are formed in the outer circumferential area of the clutch cover 64, and a pair of second preset holes 125 are formed in the outer circumferential area of the clutch guide 60. The pair of first preset holes 123 are formed symmetrically with respect to the center point of the clutch cover 64, and are located in the vicinity of the hole 122. The pair of second preset holes 125 are formed symmetrically with respect to the center point of the clutch guide 60, and are positioned to face the pair of first preset holes 123 when the clutch guide 60 is positioned in the unactuated position with respect to the clutch cover 64.

The first preset holes 123 and the second preset holes 125 correspond to a pair of third preset holes 127 formed in one end of the spool 14 in the axial direction. The pair of third preset holes 127 are formed symmetrically with respect to the center point of the spool 14, and are positioned to face the pair of first preset holes 123 of the clutch cover 64. Accordingly, when the clutch guide 60 is positioned in the unactuated position, the pair of third preset holes 127 face the pair of first preset holes 123 and the pair of second preset holes 125. The first preset holes 123, the second preset holes 125, and the third preset holes 127 correspond to preset pins 140 described below.

When the clutch guide 60 is held in the unactuated position as described above, the cross claws 104 of the clutch cover 64 are located near the openings of the respective coil spring housings 82 of the clutch guide 60. The circumferentially protruding part 104C of each of the cross claws 104 is inserted into the coil spring 70 from an axial-direction end 70A (see FIG. 7) of the coil spring 70 housed in the coil spring housing 82. The inward protruding part 104A and the outward protruding part 104B of each of the cross claws 104 are in contact with the axial-direction end of the coil spring 70. With this arrangement, the axial-direction end of each of the coil springs 70 is latched by the cross claw 104. The other axial-direction end 70B (see FIG. 7) of each of the coil springs 70 is latched by the connecting wall 86 (see FIG. 3) of the coil spring housing 82.

In this situation, the distance between each cross claw 104 and each corresponding connecting wall 86 is shorter than the total length of each coil spring 70 in a free state, and accordingly, each coil spring 70 is in a compressed state. Due to the compression of the coin springs 70, a urging force in the retraction direction acts on the clutch guide 60, and the clutch guide 60 is pushed toward the actuated position.

Meanwhile, a sufficient distance is maintained between each hole 112 of the clutch cover 64 (the rotating shaft 110 of each clutch plate 66) and each corresponding connecting wall 86 in this situation. Each of the clutch plates 66 is housed in each clutch plate housing 88 so that the knurling 66A stays at the inner side of the outer circumference of the clutch guide 60. Also, in this situation, each of the connecting walls 86 is in contact with the distal end of each arc unit 108.

Meanwhile, the switch mechanism 124 includes a lock ring 129 serving as a ring unit, an engaging member 128, and a gas generator (not shown), as shown in FIG. 3. The lock ring 129 is formed in a ring-like shape, and is positioned coaxially at the radially outer side of the clutch mechanism 56. The lock ring 129 is supported in a relatively rotatable manner with respect to the leg plate 30 of the frame 12. Knurling 129A in the form of flat teeth is formed along the inner circumferential part of the lock ring 129.

The engaging member 128 is engaged with a concave portion 130 formed in the outer circumferential part of the lock ring 129. With this arrangement, relative rotation of the lock ring 129 with respect to the frame 12 is restricted. The gas generator (not shown) provided in the switch mechanism 124 is actuated when receiving an actuation signal from an ECU (not shown). The gas generator then rotates the engaging member 128, to cancel the engaged state between the engaging member 128 and the concave portion 130 of the lock ring 129. In this manner, the restriction on relative rotation of the lock ring 129 with respect to the frame 12 is released.

The webbing retractor 10 according to this exemplary embodiment operates in the following manner.

Where the webbing belt 16 extracted from the spool 14 is attached to the body of a passenger of a vehicle, the lock mechanism 33 is activated when the vehicle is put into a rapidly-decelerated state. A lock member (not shown) provided in the lock mechanism 33 is engaged with the gear unit 34 of the lock gear 18, and rotation of the lock gear 18 is restricted.

With this arrangement, the spool 14 connected to this lock gear 18 via the main torsion shaft 20 is restrained from rotating in the extraction direction, and extraction of the webbing belt 16 from the spool 14 is restricted. Accordingly, the body of the passenger moving forward is restrained by the webbing belt 16.

Where rotation of the lock gear 18 is restricted, in the event that the body of the passenger pulls the webbing belt 16 with a larger force, and the extraction-direction rotative force of the spool 14 based on this pulling force exceeds the mechanical strength of the first energy absorbing unit 44, torsion is caused in the first energy absorbing unit 44, and the spool 14 rotates in the extraction direction by the amount equivalent to the torsion in the first energy absorbing unit 44.

Therefore, the webbing belt 16 is extracted from the spool 14 by the amount equivalent to the rotation of the spool 14. Accordingly, the load (strain) the webbing belt 16 applies to the chest of the passenger is reduced, and the energy generated from the tension of the webbing belt 16 is absorbed by the amount equivalent to the torsion.

As described above, when the spool 14 is rotated in the extraction direction with respect to the lock gear 18, relatively speaking, the lock gear 18 is rotated in the retraction direction with respect to the spool 14. Therefore, when the lock gear 18 is relatively rotated in the retraction direction with respect to the spool 14, the proximal end of the trigger wire 22 is moved in a circumferential direction of the main torsion shaft 20, with the distal end extending from the proximal end of the trigger wire 22 being inserted into the hole 48 in the spool 14. Accordingly, the distal end of the trigger wire 22 is pulled toward the lock gear 18 with respect to the hole 48.

As a result, the distal end 22B of the trigger wire 22 is pulled out from the hole 120 of the clutch guide 60 and the hole 122 of the clutch cover 64, and the restriction of relative rotation of the clutch guide 60 with respect to the spool 14 and the clutch cover 64 is released.

When the clutch guide 60 is rotationally moved from the unactuated position to the actuated position by virtue of the urging force of the coil springs 70, the distance between each hole 112 of the clutch cover 64 (the rotating shaft 110 of each clutch plate 66) and each connecting wall 86 becomes shorter, and the distal ends of the respective arc units 108 of the clutch plate 66 are pressed (guided) in the direction of tangent of the clutch guide 60 by the connecting walls 86. The clutch plates 66 are then rotationally moved toward the lock ring 129 (see the arrow R in FIG. 4), and the knurling 66A of each clutch plate 66 meshes with the knurling 129A of the lock ring 129 (see the situation illustrated in FIG. 5). With this arrangement, each clutch plate 66 and the lock ring 129 are connected to each other. At this point, the latch parts 96 formed in the clutch base 62 push the proximal end of the arms 106 in the extraction direction. As a result, the clutch plates 66 are pressed against the lock ring 129, and the connected state between the two members is maintained. Accordingly, rotation of the clutch base 62 with respect to the lock ring 129 or rotation of the sleeve 58 is restricted. In this condition, the rotative force in the extraction-direction applied to the spool 14 is transferred to the frame 12 via the sub torsion shaft 24, the sleeve 58, the clutch base 62, the clutch plates 66, the lock ring 129, and the engaging member 128.

Where rotation of the sleeve 58 is restricted, when the body of the passenger pulls the webbing belt 16 with an even larger force, and the extraction-direction rotative force of the spool 14 based on the puling force by the body of the passenger exceeds the mechanical strength of the second energy absorbing unit 54, torsion is caused on the second energy absorbing unit 54, and the spool 14 is rotated in the extraction direction by the amount equivalent to the torsion in the second energy absorbing unit 54.

Therefore, the webbing belt 16 is extracted from the spool 14 by the amount equivalent to the extraction-direction rotation of the spool 14. Accordingly, the load (strain) the webbing belt 16 applies to the chest of the passenger is reduced, and the energy generated from the tension of the webbing belt 16 is absorbed by the amount equivalent to the torsion.

In a case in which an ECU determines that the physical size of the passenger is smaller than a predetermined reference value based on a signal from a physical size detector (not shown) prior to actuation of the above described lock mechanism (not shown), the ECU actuates the gas generator (not shown).

The actuated gas generator then rotationally moves the engaging member 128, to cancel the engaged state between the engaging member 128 and the concave portion 130 of the lock ring 129. In this case, the rotative force of the spool 14 is transferred to the lock ring 129 via the clutch mechanism 56 while the clutch mechanism 56 is actuated. Accordingly, the lock ring 129 is rotated in the extraction direction together with the spool 14. Therefore, in this case, torsion is not caused in the second energy absorbing unit 54, though torsion is caused in the first energy absorbing unit 44. As a result, the second energy absorbing unit 54 does not absorb any energy.

That is, the webbing retractor 10 is designed to be capable of switching the mode between a mode to absorb energy through the second energy absorbing unit 54 in addition to energy absorption by the first energy absorbing unit 44 and a mode not to absorb energy through the second energy absorbing unit 54, in accordance with the physical size of the passenger.

Next, the functions and effects of an exemplary embodiment of the invention are described in conjunction with the method of assembling the above described clutch mechanism 56 and the method of mounting the clutch mechanism 56 onto the sub torsion shaft 24.

Figure 8:
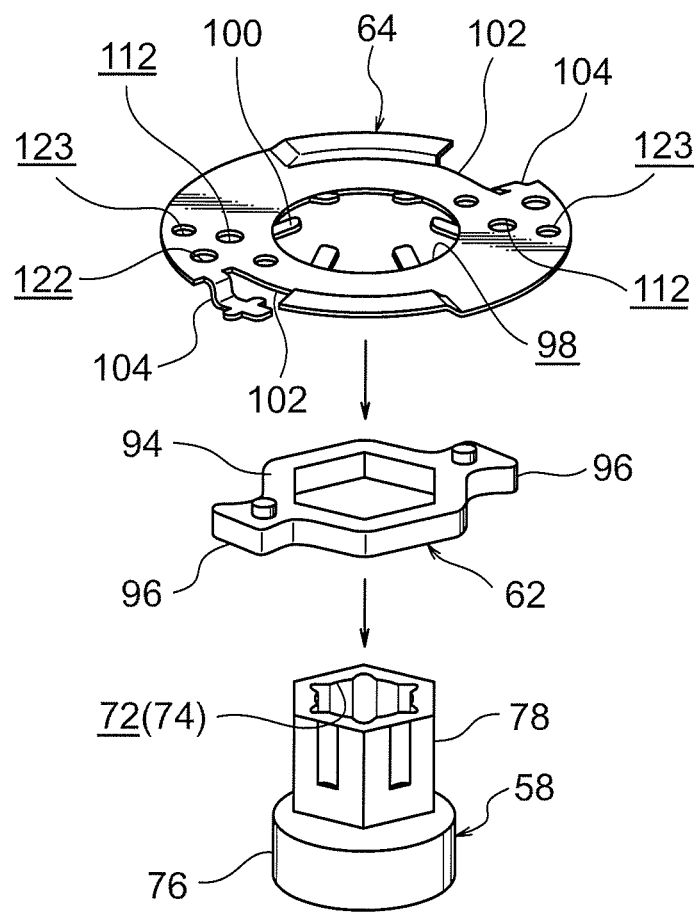
FIG. 8 is an exploded perspective view for explaining an assembling method in a sub step in the process of assembling the clutch mechanism shown in FIGS. 1 through 5.

In the webbing retractor 10 having the above described structure, the clutch mechanism 56 is assembled in the following manner. First, as shown in FIG. 8, in sub steps, the engaging unit 78 of the sleeve 58 is pressed into the engaged unit 94 of the clutch base 62, and the engaging unit 78 of the sleeve 58 is further pressed into the through hole 98 of the clutch cover 64. In this manner, the clutch base 62 and the clutch cover 64 are attached to the sleeve 58.

Figure 9:
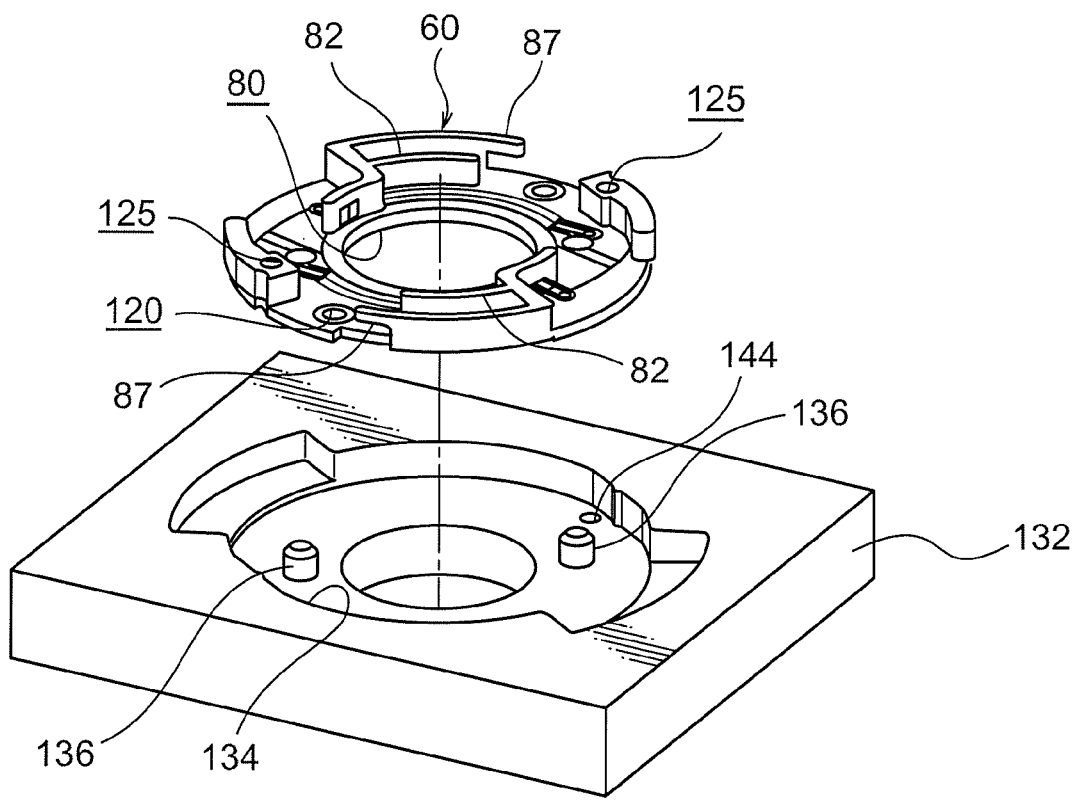
FIG. 9 is a perspective view for explaining a situation where the clutch guide is attached to an assembling jig.

The clutch guide 60 is then engaged with a concave portion 134 formed in an assembling jig 132, as shown in FIG. 9. The shape of the inner circumference of the concave portion 134 conforms to the shape of the outer circumference of the clutch guide 60. The outer circumference of the clutch guide 60 is engaged with the inner circumference of the concave portion 134, so that the clutch guide 60 is prevented from rotating with respect to the assembling jig 132. A pair of positioning pins 136 for positioning the clutch plates 66 protrude from the bottom face of the concave portion 134. A pair of holes 144 into which preset pins 140 described later are to be inserted are also formed in the bottom face of the concave portion 134 (only one of the holes 144 is shown in FIG. 9). Those holes 144 are formed in such positions as to face the pair of second preset holes 125, with the clutch guide 60 being engaged with the concave portion 134.

Figure 10:
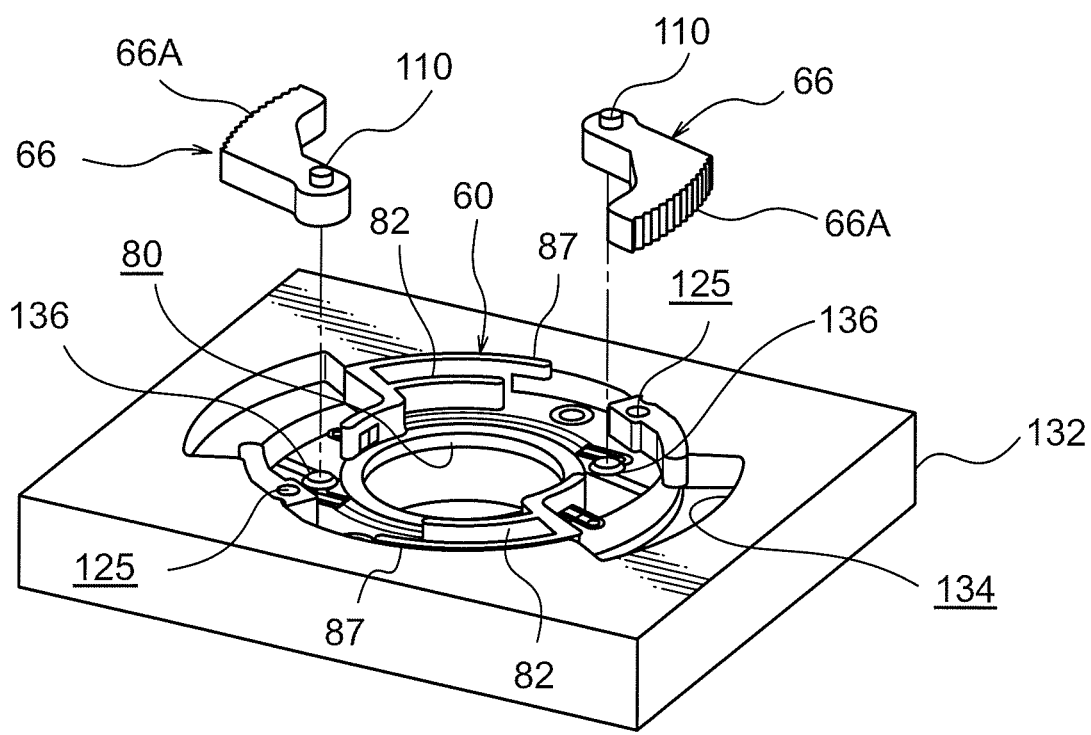
FIG. 10 is a perspective view for explaining a situation where the clutch plates are attached to the clutch guide.

The pair of clutch plates 66 are then attached to the clutch guide 60, as shown in FIG. 10. In this case, the above described positioning pins 136 are engaged with round recesses 138 (see FIG. 2) formed in the proximal end of the respective clutch plates 66, so that the clutch plates 66 are positioned with respect to the assembling jig 132 and the clutch guide 60.

Figure 11:
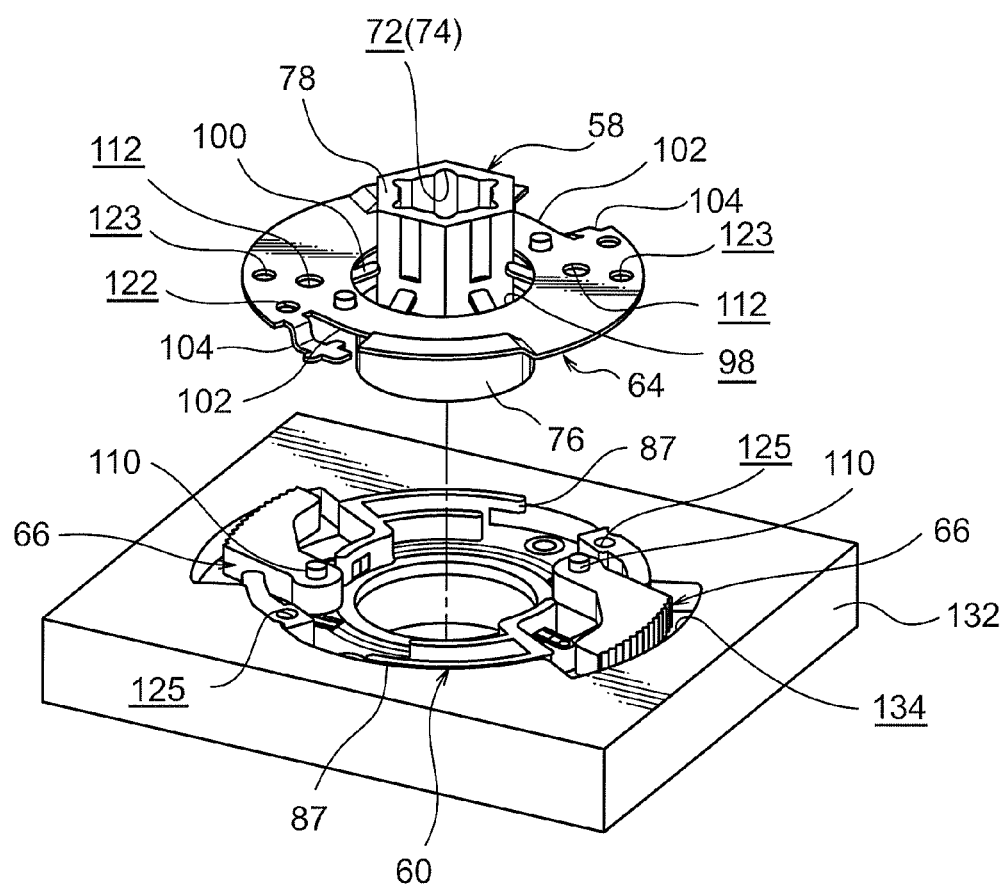
FIG. 11 is a perspective view for explaining a situation where a sleeve having the clutch cover and the clutch base incorporated thereinto is attached to the clutch guide having the clutch plates attached thereto.
Figure 12:
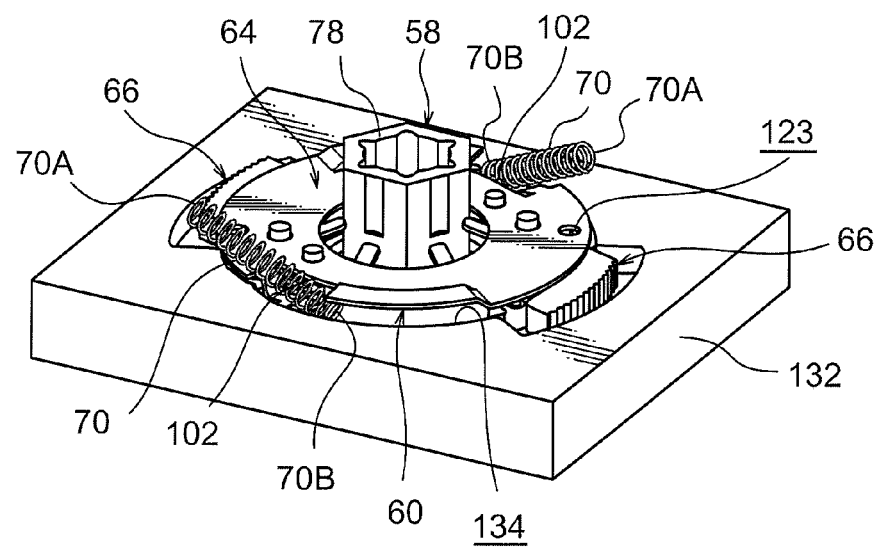
FIG. 12 is a perspective view for explaining a situation where coil springs are secured between the clutch cover and the clutch guide.

The sleeve 58, the clutch base 62, and the clutch cover 64 integrated in the above described sub steps are attached to the clutch guide 60, as shown in FIG. 11. In this case, the supporting unit 76 of the sleeve 58 is inserted into the through hole 80 of the clutch guide 60, and the rotating shafts 110 of the clutch plates 66 are inserted into the holes 112 of the clutch cover 64.

The pair of coil springs 70 are then inserted into the coil spring housings 82 (see FIGS. 1 and 3) of the clutch guide 60 via the notches 102 of the clutch cover 64, and an axial-direction end of each of the coil springs 70 is latched by the distal end of each cross claw 104. In this condition, the clutch guide 60 is positioned in the actuated position with respect to the clutch cover 64.

Figure 13:
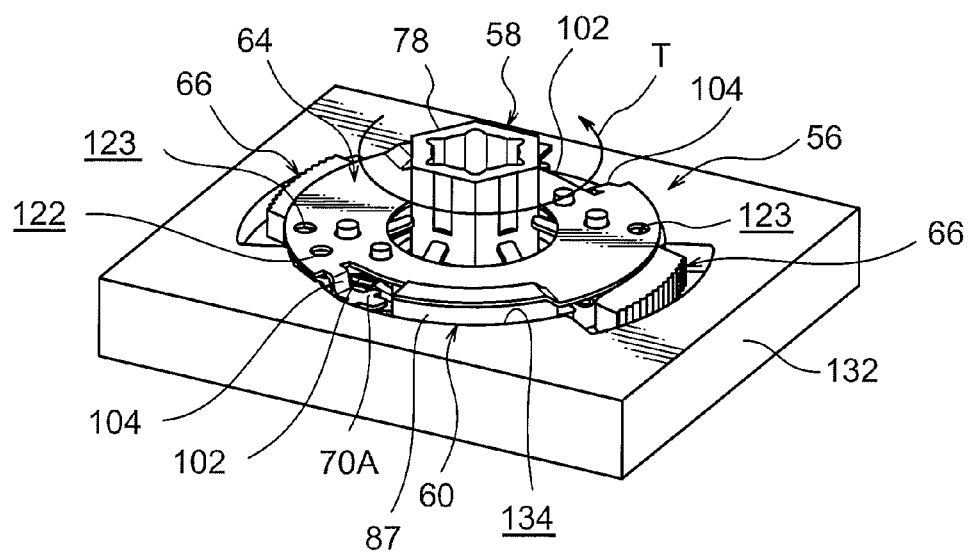
FIG. 13 is a perspective view for explaining a situation where the clutch cover is relatively rotated with respect to the clutch guide so as to position the clutch guide in the unactuated position.

The clutch cover 64 is then rotated together with the sleeve 58 and the clutch base 62 in a circumferential direction (in the direction indicated by arrow T in FIG. 13), as shown in FIG. 13. As a result, the clutch cover 64 is relatively rotated with respect to the clutch guide 60 toward the unactuated position, and each coil spring 70 is compressed between each cross claw 104 and each connecting wall 86 (see FIG. 3). As the clutch guide 60 is positioned in the unactuated position with respect to the clutch cover 64, the outward protruding part 104B of each cross claw 104 hooks each hooked portion 87 in an axial direction of the clutch guide 60 (see FIG. 6B). With this arrangement, axial-direction separation of the clutch cover 64 from the clutch guide 60 is restricted. In this situation, the first preset holes 123 of the clutch cover 64 face the second preset holes 125 of the clutch guide 60.

Figure 14:
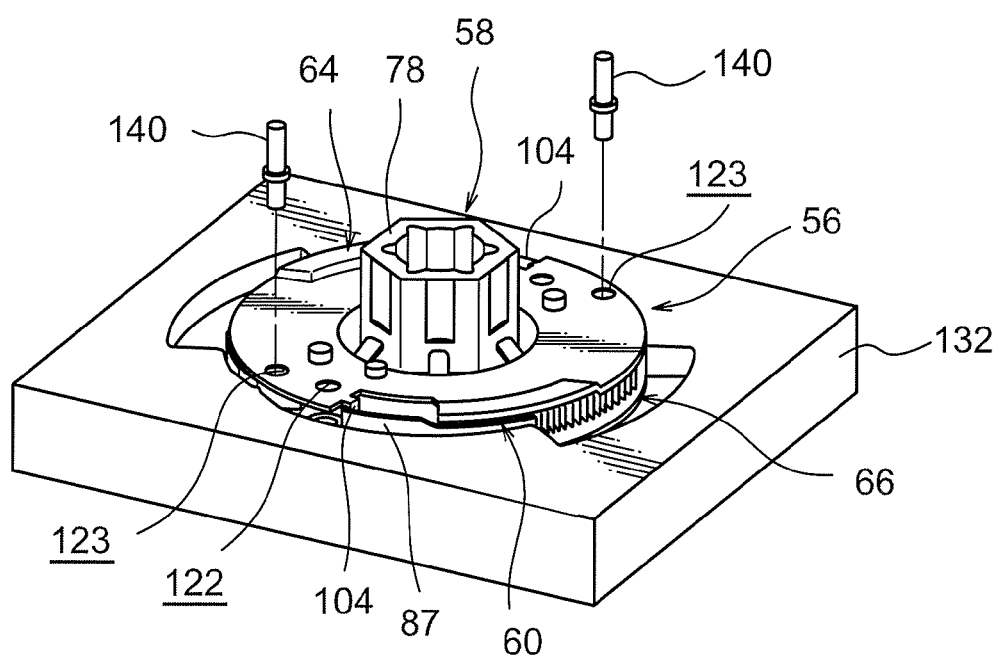
FIG. 14 is a diagram for explaining a situation where preset pins are inserted into first preset holes and second preset holes.

The cylindrical preset pins 140 are then inserted into the first preset holes 123 and the second preset holes 125, as shown in FIG. 14. The size of each of the preset pins 140 in the axial direction is set so that the top end of each of the preset pins 140 protrudes downward from the clutch guide 60 (toward the opposite side from the clutch cover 64). The preset pins 140 are further inserted into the holes 144 (see FIG. 9) of the assembling jig 132. With this arrangement, relative rotation of the clutch cover 64 with respect to the clutch guide 60 is restricted while the coil springs 70 are compressed. At this point, the process of assembling the clutch mechanism 56 is finished.

In this condition, the clutch cover 64 moves away axially from the clutch guide 60 due to the pushing force of the coil springs 70. However, as the inward protruding parts 104B of the cross claws 104 hook the hooked portions 87, separation of the clutch cover 64 from the clutch guide 60 is prevented. In this manner, the clutch mechanism 56 is subassembled while the clutch guide 60 is held in the unactuated position with respect to the clutch cover 64.

In other steps, the main body of the webbing retractor 10 is assembled and is in the state of a semifinished product 142 illustrated in FIG. 15A. Specifically, the spool 14 having the sub torsion shaft 24, the trigger wire 22, and the like attached thereto is procvided to the frame 12, and the lock mechanism 33 is attached to the leg plate 32 of the frame 12.

In the process of the installation of the clutch mechanism 56, the subassembled clutch mechanism 56 is attached to the sub torsion shaft 24 protruding from the spool 14 of the semifinished product 142, as shown in FIG. 15A. In this case, the second engaging unit 52 of the sub torsion shaft 24 is inserted into the through hole 72 of the sleeve 58, and the distal end 22B of the trigger wire 22 is inserted into the hole 120 of the clutch guide 60 and the hole 122 of the clutch cover 64. Also, the top end sides of the pair of preset pins 140 are inserted into the pair of third preset holes 127 formed in the spool 14. With this arrangement, the clutch mechanism 56 is positioned circumferentially with respect to the spool 14.

When the thread 114 of the screw 68 is screwed into the screw hole 118 of the sub torsion shaft 24, extraction-direction movement of the sleeve 58 with respect to the sub torsion shaft 24 is restricted, and the clutch mechanism 56 is secured to the sub torsion shaft 24. After that, the preset pins 140 are removed from the clutch mechanism 56, as shown in FIG. 15B. At this point, the installation of the clutch mechanism 56 is finished.

As described so far in detail, according to an exemplary embodiment of the invention, the clutch mechanism 56 can be subassembled, and therefore, there is no need to stack the components (the sleeve 58, the clutch guide 60, the clutch base 62, the clutch plates 66, the clutch cover 64, the coil springs 70, and the screw 68) of the clutch mechanism 56 one by one onto the sub torsion shaft 24 attached to a side of the spool 14. Accordingly, the installation of the clutch mechanism 56 can be made more efficient and simpler.

Furthermore, in this exemplary embodiment, the trigger wire 22 is inserted into the holes 120 and 122 of the clutch cover 64 and the clutch guide 60, and the preset pins 140 inserted through the first preset holes 123 and the second preset holes 125 are inserted into the third preset holes 127 of the spool 14, so that the clutch mechanism 56 can be positioned circumferentially with respect to the spool 14. With this arrangement, the positioning of the clutch mechanism 56 is prevented from becoming complicated. Accordingly, the installation of the clutch mechanism 56 can be made even more efficient and simpler.

Further, in this exemplary embodiment, the coil springs 70 are latched by the cross claws 104 formed in the clutch cover 64, and the outward protruding parts 104B of the cross claws 104 hook the hooked portions 87, so that axial-direction separation between the clutch cover 64 and the clutch guide 60 is restricted. That is, the cross claws 104 functioning as the latches for the coil springs 70 also function as an axial-direction separation restricting mechanism that restricts axial-direction separation between the clutch cover 64 and the clutch guide 60. Accordingly, the axial-direction separation restricting mechanism can have a simple structure.

Also, in this exemplary embodiment, the circumferentially protruding parts 104C formed in the cross claws 104 of the clutch cover 64 are inserted into the coil springs 70, and the inward protruding parts 104A and the outward protruding parts 104B formed in the cross claws 104 are in contact with the axial-direction end units 70A of the coil springs 70, so that the coil springs 70 are latched by the cross claws 104. Accordingly, the coil springs 70 can be suitably engaged with the cross claws 104. Furthermore, the distal end sides of the outward protruding parts 104B are engaged with the hooked portions 87 of the clutch guide 60, so that axial-direction separation between the clutch cover 64 and the clutch guide 60 is restricted. Accordingly, the cross claws 104 (the hooks) that form both the latches for the coil springs 70 and the axial-direction separation restricting mechanism can have simple structures.

Although the cross claws 104 formed in the clutch cover 64 serve as the hook units in the above described exemplary embodiment, the inventions according to the first, third, and fourth aspects are not limited to that structure, and the shapes of the hooks can be changed as needed.

In the above described exemplary embodiment, the cross claws 104 (the hooks) formed in the clutch cover 64 hook the hooked portions 87 formed in the clutch guide 60. However, the inventions according to the first and third aspects are not limited to that structure, and hooks formed in the clutch guide may hook hooked portions formed in the clutch cover.

In the above described exemplary embodiment, the third preset holes 127 are formed in the spool 14. However, the inventions according to the second and third aspects are not limited to that structure, and the third preset holes may not be formed.

In the above described exemplary embodiment, the clutch mechanism 56 has the first preset holes 123 and the second preset holes 125. However, the invention is not limited to that, and the first preset holes 123 and the second preset holes 125 may not be formed. In such a case, relative rotation of the clutch guide 60 and the clutch cover 64 with respect to each other is restricted with the use of members or tools other than the preset pins 140. In this manner, the clutch mechanism 56 can be subassembled.

In the above described exemplary embodiment, the clutch mechanism 56 includes the axial-direction separation restricting mechanism (the cross claws 104 and the hooked portions 87). However, the invention is not limited to that structure, and the axial-direction separation restricting mechanism may not be provided. In such a case, the preset pins are made to have the function to restrict axial-direction separation between the clutch guide 60 and the clutch cover 64, so that the clutch mechanism 56 can be subassembled.

In the above described exemplary embodiment, the sub torsion shaft 24 is used as the rotatable member. However, the invention is not limited to that structure, and the rotatable member may be any member that rotates with the spool 14, and may be integrally formed with the spool 14.

Various modifications may be made to the invention without departing from the scope thereof. Also, the invention is of course not limited to the above described embodiments.

What is claimed is:

1. A webbing retractor comprising:
a clutch mechanism that is attached to a rotatable member rotating integrally with a spool rotatably supported by a frame, the clutch mechanism being capable of connecting the rotatable member and a ring unit positioned at a side of the frame,
the clutch mechanism comprising:
a lock member fixed to the rotatable member;
a clutch cover that rotates integrally with the lock member;
a clutch guide that is positioned between the clutch cover and the spool and is restrained from moving in an axial direction, the clutch guide being supported in a relatively rotatable manner with respect to the lock member, the clutch guide being capable of relatively rotating between an unactuated position and an actuated position with respect to the clutch cover, and the clutch guide being engaged with a trigger member positioned at a side of the spool and being held in the unactuated position;
a spring that is in a compressed state and is positioned between the clutch cover and the clutch guide, and that urges the clutch guide held in the unactuated position toward the actuated position;
a pawl that is positioned between the clutch cover and the clutch guide, and that is moved toward the ring unit and is engaged with the ring unit in accordance with the clutch guide being rotated from the unactuated position to the actuated position by the urging force of the spring in the event that the trigger member is disengaged from the clutch guide; and
an axial-direction separation restricting mechanism that restricts axial-direction separation between the clutch cover and the clutch guide while allowing the relative rotation of the clutch cover and the clutch guide with respect to each other, the axial-direction separation restricting mechanism including: a hooked portion that is formed at one of the clutch cover or the clutch guide and that extends in a circumferential direction of the clutch guide; and a hook that is formed at the other one of the clutch cover or the clutch guide and hooks the hooked portion,
wherein the hook is formed at the clutch cover, and the spring is latched by the hook.

2. The webbing retractor of claim 1, wherein the hook hooks the hooked portion in the axial direction of the clutch guide.

3. The webbing retractor of claim 1, wherein the spring is a coil spring, and the hook has an inward protruding part that protrudes inward in a radial direction of the clutch cover and is in contact with an axial-direction end of the coil spring, an outward protruding part that protrudes outward in the radial direction of the clutch cover and is engaged with the hooked portion of the clutch guide, and a circumferentially protruding part that protrudes in a circumferential direction of the clutch cover and is inserted into the coil spring.

4. The webbing retractor of claim 1, wherein the spool has a third preset hole formed therein, the third preset hole facing the first preset hole and the second preset hole when the clutch guide is positioned in the unactuated position.

5. The webbing retractor of claim 1, wherein the hooked portion and the hook are formed so as to be oriented in opposite directions from each other in the circumferential direction of the clutch guide.

6. The webbing retractor of claim 1, wherein the spring is a coil spring, and the hook is in direct contact with an axial-direction end of the coil spring.

7. A webbing retractor comprising:
a clutch mechanism that is attached to a rotatable member rotating integrally with a spool rotatably supported by a frame, the clutch mechanism being capable of connecting the rotatable member and a ring unit positioned at a side of the frame,
the clutch mechanism comprising:
a lock member fixed to the rotatable member;
a clutch cover that rotates integrally with the lock member;
a clutch guide that is positioned between the clutch cover and the spool and is restrained from moving in an axial direction, the clutch guide being supported in a relatively rotatable manner with respect to the lock member, the clutch guide being capable of relatively rotating between an unactuated position and an actuated position with respect to the clutch cover, and the clutch guide being engaged with a trigger member positioned at a side of the spool and being held in the unactuated position;
a spring that is in a compressed state and is positioned between the clutch cover and the clutch guide, and that urges the clutch guide held in the unactuated position toward the actuated position;
a pawl that is positioned between the clutch cover and the clutch guide, and that is moved toward the ring unit and is engaged with the ring unit in accordance with the clutch guide being rotated from the unactuated position to the actuated position by the urging force of the spring in the event that the trigger member is disengaged from the clutch guide;
an axial-direction separation restricting mechanism that restricts axial-direction separation between the clutch cover and the clutch guide while allowing the relative rotation of the clutch cover and the clutch guide with respect to each other, the axial-direction separation restricting mechanism including: a hooked portion that is formed at one of the clutch cover or the clutch guide and extends in a circumferential direction of the clutch guide; and a hook that is formed at the other one of the clutch cover or the clutch guide and hooks the hooked portion;
a first preset hole formed in the clutch cover; and
a second preset hole that is formed in the clutch guide and faces the first preset hole when the clutch guide is positioned in the unactuated position,
wherein the first preset hole is formed at an outer circumferential area with respect to a central hole of the clutch cover, and the second preset hole is formed at an outer circumferential area with respect to a central hole of the clutch guide, and wherein the hook is formed at the clutch cover, and the spring is latched by the hook.

8. The webbing retractor of claim 7, wherein the hook hooks the hooked portion in the axial direction of the clutch guide.

9. The webbing retractor of claim 7, wherein the spring is a coil spring, and the hook has an inward protruding part that protrudes inward in a radial direction of the clutch cover and is in contact with an axial-direction end of the coil spring, an outward protruding part that protrudes outward in the radial direction of the clutch cover and is engaged with the hooked portion of the clutch guide, and a circumferentially protruding part that protrudes in a circumferential direction of the clutch cover and is inserted into the coil spring.

10. The webbing retractor of claim 7, wherein the spool has a third preset hole formed therein, the third preset hole facing the first preset hole and the second preset hole when the clutch guide is positioned in the unactuated position.

* * * * *